G. MELNIK.
TIRE ARMOR.
APPLICATION FILED JULY 27, 1914.
1,114,787.
Patented Oct. 27, 1914.
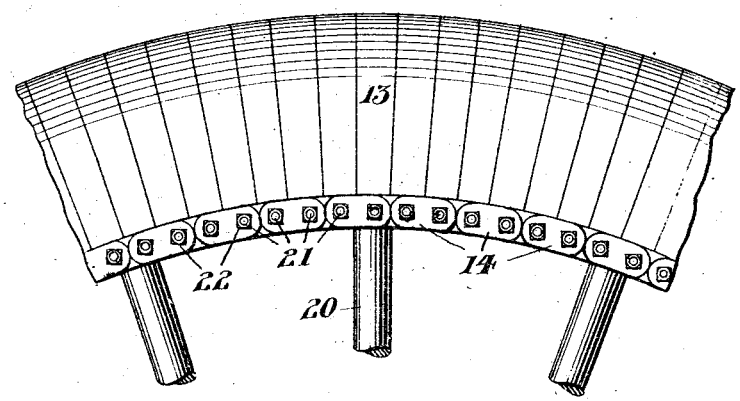
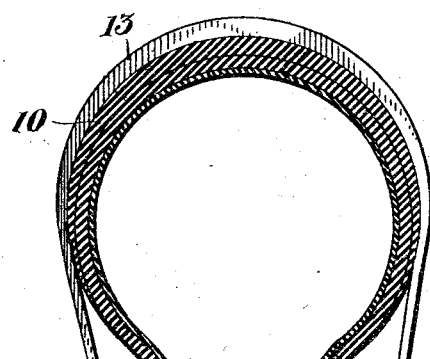
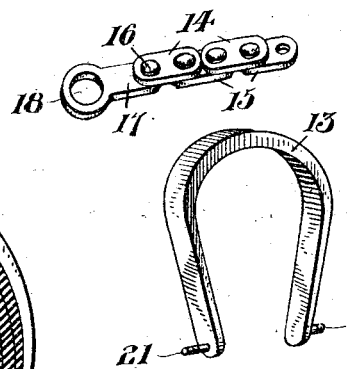
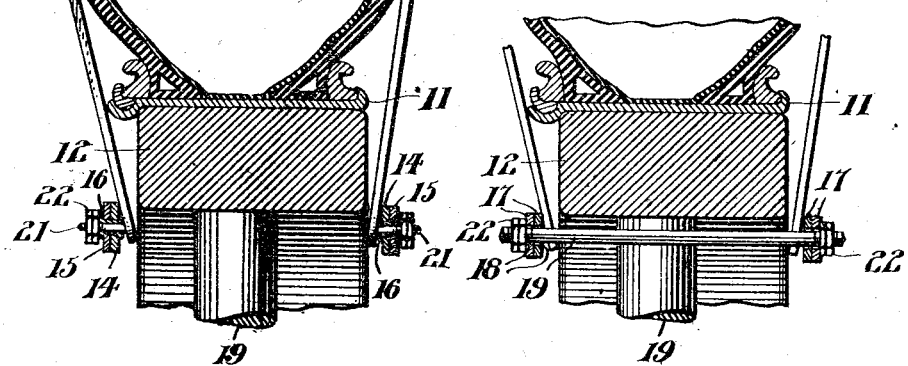
Witnesses
Inventor
George Melnik
By
A. M. Wilson
Attorney

UNITED STATES PATENT OFFICE.

GEORGE MELNIK, OF NEW YORK, N. Y.

TIRE-ARMOR.

1,114,787.

Specification of Letters Patent.  Patented Oct. 27, 1914.

Application filed July 27, 1914.  Serial No. 853,440.

*To all whom it may concern:*

Be it known that I, GEORGE MELNIK, a subject of the Emperor of Austria-Hungary, residing at New York, in the county of New York and State of New York, have invented certain new and useful Improvements in Tire-Armor, of which the following is a specification.

This invention relates to new and useful improvements in tire armor.

The primary object of this invention is to provide a metallic armor completely inclosing the automobile tire and readily attached thereto, as well as detached therefrom.

A further object is to provide a plurality of armor plates pivoted at their opposite ends to circumferentially positioned chains at the opposite sides of the wheel felly.

A still further object is to provide opposite chains having tubular link-pivots forming bearings for the ends of tire-tread armor plates, the said chains and plates being readily removable.

With these general objects in view, and others that will appear as the nature of the invention is better understood, the same consists in the novel combination hereinafter described, illustrated in the accompanying drawings, and then claimed.

In the drawings forming a part of this application and in which like designating characters refer to corresponding parts throughout the several views, Figure 1 is a side elevation of a portion of an automobile wheel, provided with the present device. Fig. 2 is a transverse radial sectional view thereof. Fig. 3 is a similar view upon the line of the securing bolt partially broken away. Fig. 4 is a perspective view of one of the armor links detached, and, Fig. 5 is a perspective view of an end portion of one of the mounting chains.

Referring more in detail to the drawings, the present device is illustrated mounted upon a wheel having a pneumatic tire 10, which is inclosed by the armor, the said tire being positioned in the usual rim 11 of the felly 12.

The armor consists of arch-shaped metallic links 13 preferably formed of slightly resilient metal and adapted to be sprung around the tire, and positioned upon the entire tread portion thereof, and with the adjacent links having their sides lying in contact. Securing chains 14 are arranged at opposite sides of the felly 12, and consist of a plurality of links 15 hinged together by tubular pivoting rivets 16, and each chain having a terminal link 17 of the form illustrated in Fig. 5, and provided with an enlarged perforation 18 therethrough for receiving a bolt 19 positioned transversely of the wheel, inwardly of the felly 12, and between the adjacent two spokes 20, as best illustrated in Fig. 3. The links 13 are provided at their opposite ends with outwardly projecting pins 21, adapted to be received and journaled within the tubular rivets 16 at opposite sides of the wheel, while the outer ends of said pins are screw-threaded to receive lock-nuts 22.

It will thus be seen that the entire armor is made up complete of the links 13, hinged to the side chains 14, and that the links are readily sprung over the tire for mounting thereon when the bolt 19 is removed while the ends of the armor are secured together by said bolts, thus forming a continuous circular armor which completely incloses the tire, and protects the same as well as providing a slightly resilient metallic tread for the tire which by reason of the plurality of links will slightly separate under pressure which assists in the traction qualities of the wheel.

While the forms of the invention herein shown and described are what are believed to be preferable embodiments thereof, minor changes may be made in the invention without departing from the spirit and scope thereof as claimed.

What I claim is:—

A tire armor comprising chains oppositely positioned and having tubular pivot connections between the links of said chains, arched-shaped resilient metallic links equal in number to the pivots of each chain, outwardly projecting threaded pins upon the opposite ends of each link and positioned within the opposite one of said pivots, locknuts upon the threaded portions of said pins, and perforated terminal links at the opposite ends of each of said chains, and a locking bolt positioned transversely of the chains and secured through the perforations of all of said terminal links.

In testimony whereof I affix my signature in presence of two witnesses.

GEORGE MELNIK.

Witnesses:
 ALEXANDER MALON,
 FELIKS MELNYK.